March 20, 1973     R. G. SENESAC ET AL     3,721,469
TAIL GATE APPARATUS
Filed Jan. 11, 1971     2 Sheets-Sheet 1
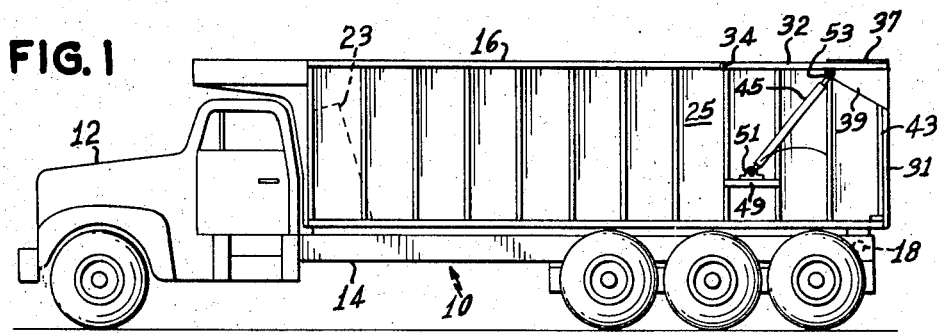
FIG. 1
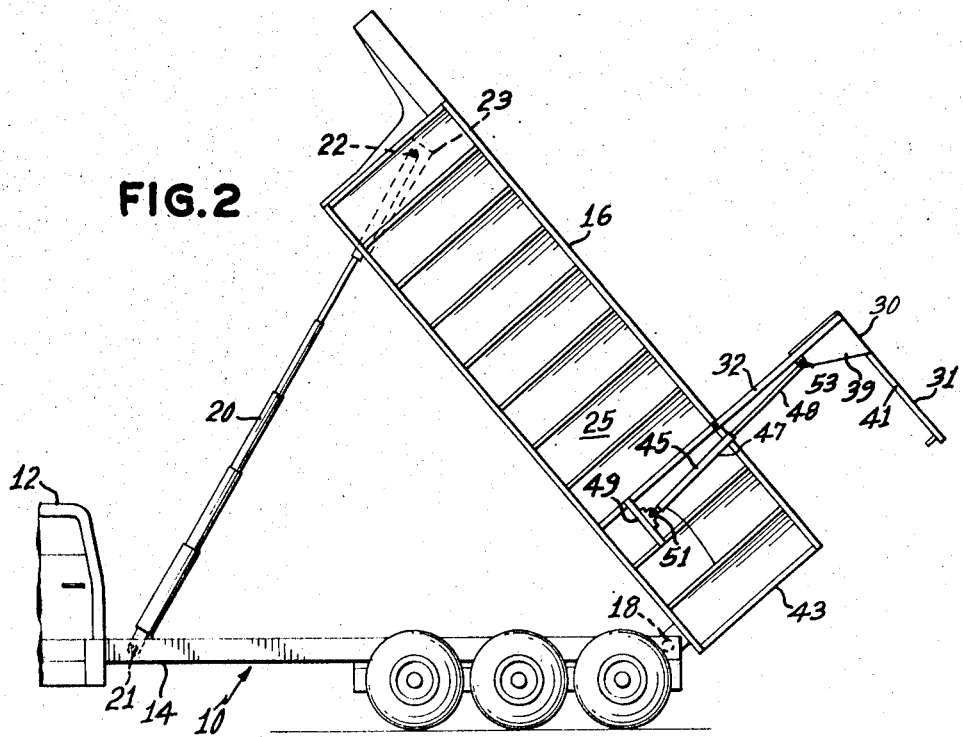
FIG. 2
FIG. 3
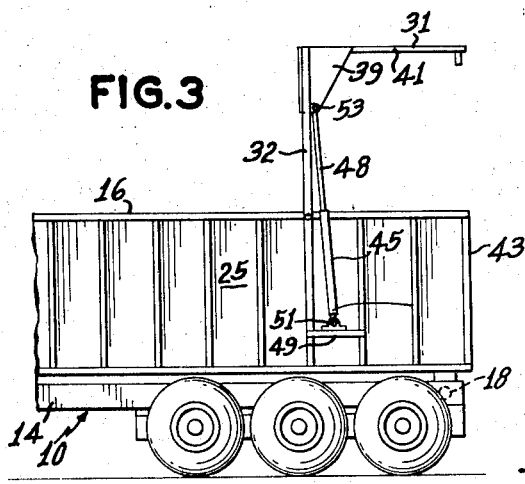
INVENTORS
Real G. Senesac
Guy M. Senesac
BY
George H. Baldwin
ATTORNEY March 20, 1973 R. G. SENESAC ET AL 3,721,469
TAIL GATE APPARATUS
Filed Jan. 11, 1971 2 Sheets-Sheet 2
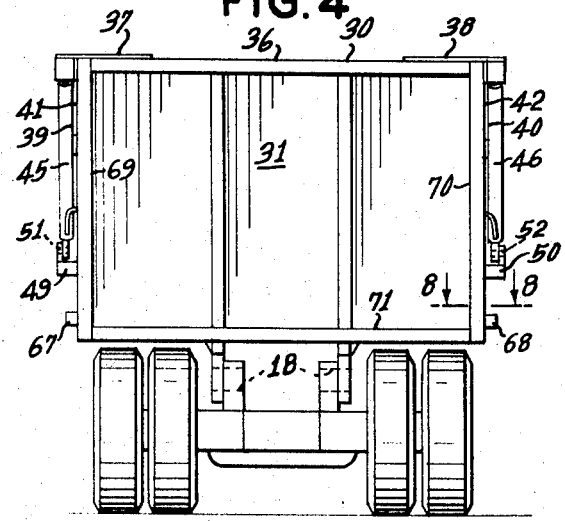
INVENTORS
Real G. Senesac
Guy M. Senesac
BY
George H. Baldwin
ATTORNEY United States Patent Office 3,721,469
Patented Mar. 20, 1973

3,721,469
TAIL GATE APPARATUS
Real G. Senesac, 961 Carlotta Road W. 32211, and Guy
M. Senesac, 2235 St. John's Bluff Road S. 32216, both
of Jacksonville, Fla.
Filed Jan. 11, 1971, Ser. No. 105,288
Int. Cl. B61d 9/00
U.S. Cl. 298—23 MD
8 Claims

ABSTRACT OF THE DISCLOSURE

A tail gate aparatus includes an upstanding rear wall and a pair of spaced elongated arms rigidly connected to the rear wall adjacent the upper edge thereof and pivotally connected to respective side walls adjacent the upper edges thereof and forwardly remote from the rear body opening. The arms are disposed along and outwardly of the side wall upper edges for rigidifying same and guide members are connected to the rear wall adjacent the lower edge which cooperate with the side walls. Power means are attached to the tail gate apparatus for opening and closing the rear body opening and when open the rear wall is generally parallel to and above the body bottom wall and spaced upwardly a substantial distance above the side wall upper edges to provide a dumping opening of substantially twice the area of the rear wall.

BACKGROUND OF THE INVENTION

Field of the invention

This invention relates to dump trucks and more particularly to a tail gate apparatus of improved construction and operation.

Description of the prior art

Dump trucks and tail gates therefor of various constructions have been previously suggested and marketed but for one reason or another have not proven to be satisfactory. Exemplary of some of the prior art arrangements are the following U.S. Pats.: 2,208,691; 2,239,029; 2,246,-358; 2,410,046; 3,254,919; 3,325,216 and 3,440,764. Such prior art fails however, to teach or suggest a tail gate apparatus which could be adapted in any obvious manner to achieve the results or perform the functions of the improved tail gate apparatus described and claimed herein.

SUMMARY OF THE INVENTION

An aspect of the invention relates to a dump truck body tail gate apparatus including an upstanding rear wall and a pair of spaced elongated arms having rear end portions connected to the rear wall adjacent the upper edge thereof and forward end portions pivotally connected to respective body side walls adjacent the upper edges thereof and forwardly remote from the opening. Means are attached to the tail gate apparatus for moving the rear wall between a position closing the opening and an open position with the rear wall generally parallel to and above the bottom body wall and spaced upwardly a substantial distance above the body side wall upper edges.

Other aspects include locating the pair of spaced elongated arms along and outwardly of the upper edges of the body side walls for maintaining same in upright condition during loading of the body. A pair of spaced members are connected to the rear wall adjacent the lower edge thereof, such members extending forwardly and cooperating with respective body side walls for rigidifying same and providing tail gate guides during lowering of the rear wall into its closing position. The pair of spaced members extend generally longitudinally of the body and each one includes a free end spaced laterally away from its respective side walls. A pair of horizontal gusset plates are attached between respective arms and the rear wall upper edge and a pair of vertical gusset plates are attached between respective arms and respective side edges of the rear wall. The pair of arms are substantially equal in length to the height of the body side walls for providing a dumping opening for the truck body of substantially twice the area of the opening closed by the rear wall whereby loads extending above the side walls may be readily removed therefrom.

A general object of the invention is to provide an improved tail gate apparatus for dump trucks.

A particular object of this invention is to provide a tail gate apparatus which provides a discharge opening for the dump truck of substantially increased dimensions whereby loads extending above the side walls of the truck body may be readily removed upon opening of the tail gate apparatus and dumping of the body.

Another particular object is the provision of an improved tail gate apparatus which may be inexpensively incorporated on new truck bodies at the factory, or which may be readily mounted on existing dump truck bodies.

A specific object is to provide an improved tail gate apparatus which includes a pair of arms disposed outwardly and alongside of the upper edges of the side walls adjacent the discharge opening to inhibit bulging of the side walls during loading and travelling of the loaded truck body.

Another specific object is to provide tail gate guides adjacent the lower corners of the tail gate which cooperate with the side walls and rigidify same.

BFIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevational view of the dump truck incorporating the tail gate apparatus in accord with the invention;

FIG. 2 is a view similar to FIG. 1 but showing the body in dumping elevated position with the tail gate in fully opened position;

FIG. 3 is a view similar to FIG. 1 but showing the tail gate in fully opened position;

FIG. 4 is a rear elevational view of the truck of FIG. 1;

FIG. 5 is a partial plan view of the body of the truck of FIG. 1;

FIG. 6 is a view similar to FIG. 4 but showing the tail gate in fully opened position;

FIG. 7 is a partial cross-sectional view taken along line 7—7 of FIG. 5;

FIG. 8 is a partial cross-sectional view taken along line 8—8 of FIG. 4; and

FIG. 8A is a view similar to FIG. 8 but showing an alternate construction for the bottom portion of the tail gate apparatus.

DESCRIPTION OF THE PREFERRED EMBODIMENT

Referring now more particularly to the drawings, a dump truck is designated at 10 which includes a motorized cab and engine compartment 12 mounted on a chassis 14 to which a tiltable dump body 16 is pivotally connected adjacent the rearward end thereof by pivot connection means 18 in a conventional manner. Appropriate hoisting or elevating means in the form of, for example, an assembly 20, including a plurality of telescopically related cylinder and piston elements, is connected at one end to the chassis 14 by pivot means 21 and to the body 16 by pivot means 22. Assembly 20 extends into a downwardly open encasement 23, as illustrated by broken lines in FIG. 1, larger in width than the largest width dimension of assembly 20, when assembly 20 is in its collapsed or fully retracted position.

The body 16 includes a pair of side walls 25 and 26 upstanding from bottom wall 27 and defining an opening 28 adjacent the rearward end thereof, as shown in FIGS. 5 and 6, through which materials loaded onto the body 16 may be dumped upon opening tail gate apparatus 30 and tilting body 16 upwardly by extension of assembly 20, as depicted in FIG. 2.

The tail gate apparatus 30 in accord with the invention includes an upstanding rear wall 31 and a pair of spaced elongated box member arms 32 and 33 having forward and rear end portions with the forward end portions being respectively connected by a pair of pivot means 34 and 35 forwardly spaced from opening 28 and the rear end portions being rigidly attached to the rear wall 31 adjacent the upper edge 36 thereof. Arms 32 and 33 are seen to be disposed respectively outwardly of side walls 25 and 26 for maintaining side walls 25 and 26 in upright non-bulging condition during loading of the body. Horizontally disposed gusset plates 37 and 38 are rigidly connected to respective arms 32 and 33 and to the rear wall upper edge 36 for reinforcing the connection between the arms 32 and 33 and the rear wall 31 thereby inhibiting bulging of the side walls 25 and 26 adjacent the rear wall 31. Vertically disposed gusset plates 39 and 40 are also rigidly attached to respective arms 32 and 33 and the side edges 41 and 42 of rear wall 31 to reinforce the connection between arms 32 and 33 and rear wall 31 and to maintain rear wall 31 in an upstanding position with respect to bottom wall 27 whereby rear wall 31 closingly engages the rearward edges 43 and 44 of side walls 25 and 26 to close dumping opening 28 therebetween.

Means are attached between the tail gate apparatus 30 and the body 16, in the form of a pair of single-acting power cylinders 45 and 46, preferably hydraulic, each including an elongated cylinder 47 and piston 48. Supports 49 and 50 are respectively attached outwardly of and to side walls 25 and 26, generally below pivot means 34 and 35, and the lower ends of cylinders 47 are respectively pivotally mounted to supports 49 and 50 by pivot means 51 and 52. The upper ends of pistons 48 are respectively pivotally connected to gusset plates 39 and 40 by pivot means 53 and 54, as shown most clearly in FIG. 6.

A suitable source of power, as well as controls therefor normally located in the operator's cab 12, for power cylinders 45 and 46 and assembly 20 are not shown but are well known in the art. Since the assembly 20 is normaly hydraulic, it has been found desirable to employ hydraulic cylinders 45 and 46 rather than powering same pneumatically.

The pivot means 35 is specifically shown in FIG. 7 and includes a pivot pin 60 extending through box member arm 33, box member upper edge or rail portion 61 of side wall 26 and body sheet metal 62, pin 35 being maintained in proper position by enlarged flared end portions 63 and 64 or by other suitable means known in the art.

As seen in FIGS. 4, 5, 6 and 8 a pair of spaced members 67 and 68 are respectively connected to box forming side members 69 and 70 of rear wall 31 adjacent the box forming lower edge member 71. Member 68 extends forwardly of the body and engages the upright box forming rear edge 44 of side wall 26, member 68 slidingly engaging outer face 72 of box member rear edge 44, as shown in FIG. 8. Spaced members 67 and 68 not only rigidify the side walls 25 and 26, but also inhibit objectional lateral movement of the rear wall 31 with respect to the side walls 25 and 26. Furthermore, these members 67 and 68 extend angularly outward thereby providing giudes for the tail gate apparatus during lowering of the rear wall 31 into its closing position.

On many body constructions it may be preferable to provide such guide members internally of the body as shown by guides 75 in FIG. 8A with the remaining components being indicated by prime numerals, but in this construction the guide 75 may engage body sheet metal 62', for example.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a dump truck for heavy loads having a body including a front wall and a pair of side walls upstanding from the bottom wall and defining an opening adjacent the rearward end thereof, the improvement comprising a tail gate apparatus including an upstanding rear wall, a pair of spaced elongated arms having forward and rear end portions and extending perpendicular to said rear wall, said rear end portions being connected to said rear wall adjacent the upper edge of said rear wall, reinforcing means connected between said arms and said rear wall upper edge to maintain said arms and rear wall in perpendicular relation, said forward end portions being pivotally connected to respective said side walls adjacent the upper edges thereof and forwardly remote from said opening, said arms comprising rigid structural members disposed along and outwardly of respective said upper edges of said side walls and in sliding contact with portions thereof for maintaining said side walls in upright and non-bulging condition during heavy loading of said body, a pair of power cylinder and piston assemblies located outwardly of respective said side walls and attached between said body and said tail gate apparatus for moving said rear wall between a position closing said opening and an open position with said rear wall generally parallel to and above said bottom wall and spaced upwardly a substantial distance above said side wall upper edges.

2. In the dump truck as defined in claim 1 further comprising a pair of spaced guide members connected to said rear wall adjacent the lower edge thereof, said guide members extending forwardly and cooperating with respective said side walls for rigidifying said side walls and providing tail gate guides during lower of said rear wall into its closing position.

3. In the dump truck as defined in claim 2 wherein said pair of spaced guide members extend generally longitudinally of said body and having free ends spaced laterally away from respective said side walls.

4. In the dump truck as defined in claim 1 wherein said reinforcing means include a pair of horizontal gusset plates attached between respective said structural members and said rear wall upper edge.

5. In the dump truck as defined in claim 1 wherein said reinforcing means include a pair of vertical gusset plates attached between respective said structural members and respective side edges of said rear wall.

6. In the dump truck as defined in claim 5 wherein said reinforcing means include a pair of horizontal gusset plates attached between respective said structural members and said rear wall upper edge.

7. In the dump truck as defined in claim 1 wherein said pair of structural members are substantially equal in length to the height of said side walls for providing a dumping opening for said body of the truck of substantially twice the area of said opening defined between said bottom and said side walls whereby loads extending above said side walls may be readily removed upon dumping of said body.

8. In the dump truck as defined in claim 1, wherein said pair of spaced elongated structural members each includes a box member disposed along and outwardly of respective said upper edges of said side walls, said box members rigidifying said side walls and maintaining same in upright-nonbulging condition during heavy loading of said body.

References Cited

UNITED STATES PATENTS

| | | | |
|---|---|---|---|
| 3,325,216 | 6/1967 | Boeck | 298—23 MD |
| 3,254,919 | 6/1966 | Birchmeier | 298—23 MD |
| 2,829,001 | 4/1958 | Leaphart | 296—60 X |
| 677,945 | 7/1901 | Collis | 296—60 |
| 2,213,385 | 9/1940 | Dailey | 298—23 D |
| 730,607 | 6/1903 | Brown | 298—23 R |
| 1,998,731 | 4/1935 | Newcomb | 298—23 R X |
| 2,711,343 | 6/1955 | Falk et al. | 296—24 R |

FOREIGN PATENTS

| | | | |
|---|---|---|---|
| 125,755 | 4/1919 | Great Britain | 298—23 DF |
| 419,643 | 10/1925 | Germany | 298—23 DF |
| 114,148 | 11/1941 | Australia | 298—23 MD |

ROBERT J. SPAR, Primary Examiner

U.S. Cl. X.R.

296—56